US010726412B2

(12) United States Patent
Yehuda et al.

(10) Patent No.: US 10,726,412 B2
(45) Date of Patent: Jul. 28, 2020

(54) PORTABLE DEVICE WITH LOCAL VERIFICATION DATA

(71) Applicant: VISA International Service Association, San Francisco, CA (US)

(72) Inventors: Shlomo Yehuda, Redmond, WA (US); Bhavana Tammineni, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 143 days.

(21) Appl. No.: 15/595,799

(22) Filed: May 15, 2017

(65) Prior Publication Data

US 2018/0330355 A1    Nov. 15, 2018

(51) Int. Cl.
| | |
|---|---|
| G06Q 20/00 | (2012.01) |
| G06Q 20/32 | (2012.01) |
| G07F 7/08 | (2006.01) |
| G06Q 20/20 | (2012.01) |
| G06Q 20/40 | (2012.01) |

(52) U.S. Cl.
CPC ......... *G06Q 20/327* (2013.01); *G06Q 20/202* (2013.01); *G06Q 20/4014* (2013.01); *G07F 7/0813* (2013.01); *G07F 7/0886* (2013.01)

(58) Field of Classification Search
CPC ......... G06Q 10/00; G06Q 20/20; G06K 15/00
USPC ...................................... 705/67, 18; 235/383
See application file for complete search history.

(56) References Cited

U.S. PATENT DOCUMENTS

| | | | |
|---|---|---|---|
| 5,321,751 A | 6/1994 | Ray et al. | |
| 6,175,922 B1 * | 1/2001 | Wang | G06Q 20/02 380/255 |
| 6,224,109 B1 | 5/2001 | Yang | |
| 6,325,285 B1 | 12/2001 | Baratelli | |

(Continued)

FOREIGN PATENT DOCUMENTS

| | | |
|---|---|---|
| IN | 3575/CHE/2015 | 8/2012 |
| KR | 1020130050039 | 5/2013 |
| WO | 0148686 | 7/2001 |

OTHER PUBLICATIONS

PCT/US2018/024871 , "International Search Report and Written Opinion", dated Jul. 17, 2018, 14 pages.

(Continued)

*Primary Examiner* — Oluseye Iwarere
(74) *Attorney, Agent, or Firm* — Kilpatrick Townsend & Stockton (57) ABSTRACT

Embodiments of the disclosure are directed to systems and methods in which verification data is written to a portable device and used to complete a transaction. The system may identify a number of trusted third-party entities computers capable of providing verification data associated with a particular user. The system may generate requests to each of the trusted third-party computers for that verification data. Upon receiving responses, the system may select an appropriate verification data from the responses received from those trusted third-party computers. The verification data is then written to a portable device, which is provided to a user with which it is associated. Once provided, the portable device may be used in a transaction conducted at a resource provider and the verification data may be caused to be displayed on a display operated by the resource provider.

13 Claims, 7 Drawing Sheets

(56) References Cited

U.S. PATENT DOCUMENTS

| | | | |
|---|---|---|---|
| 7,207,480 B1 | 4/2007 | Geddes | |
| 7,959,074 B1 | 6/2011 | Chopra et al. | |
| 8,083,141 B1* | 12/2011 | Courtright | G06Q 20/1085 |
| | | | 235/380 |
| 8,577,810 B1* | 11/2013 | Dalit | G06F 21/32 |
| | | | 705/1.1 |
| 9,183,554 B1* | 11/2015 | Courtright | G06F 21/36 |
| 9,286,494 B1* | 3/2016 | Lamfalusi | G06K 7/0004 |
| 9,471,921 B1* | 10/2016 | Dalit | G06F 21/32 |
| 9,547,861 B2* | 1/2017 | Itwaru | G06Q 20/4012 |
| 9,697,508 B1* | 7/2017 | Ramalingam | H04W 4/029 |
| 10,366,378 B1* | 7/2019 | Han | G06Q 20/204 |
| 2002/0147679 A1 | 10/2002 | Tardif | |
| 2008/0313082 A1 | 12/2008 | Van Bosch et al. | |
| 2009/0132813 A1* | 5/2009 | Schibuk | G06Q 20/223 |
| | | | 713/158 |
| 2012/0185398 A1* | 7/2012 | Weis | G06Q 20/20 |
| | | | 705/75 |
| 2012/0197740 A1* | 8/2012 | Grigg | G06Q 20/20 |
| | | | 705/16 |
| 2013/0254117 A1 | 9/2013 | Von Mueller et al. | |
| 2014/0006190 A1* | 1/2014 | Loomis, III | G06Q 20/20 |
| | | | 705/18 |
| 2014/0046785 A1* | 2/2014 | Jenkins | G06Q 20/206 |
| | | | 705/18 |
| 2014/0337930 A1* | 11/2014 | Hoyos | H04L 63/10 |
| | | | 726/4 |
| 2014/0344084 A1 | 11/2014 | Rothschild | |
| 2015/0100493 A1* | 4/2015 | Carnesi, Sr. | G06Q 20/40145 |
| | | | 705/64 |
| 2015/0264567 A1* | 9/2015 | Sensharma | H04W 12/06 |
| | | | 455/411 |
| 2016/0055322 A1* | 2/2016 | Thomas | G06F 21/10 |
| | | | 726/7 |
| 2016/0098716 A1 | 4/2016 | Oder, II et al. | |
| 2016/0241402 A1* | 8/2016 | Gordon | H04L 9/3228 |
| 2016/0364701 A1* | 12/2016 | Nayfack | G06Q 20/0855 |
| 2017/0076293 A1* | 3/2017 | Cage | G06Q 20/40145 |
| 2017/0132632 A1* | 5/2017 | Knudsen | H04W 12/06 |
| 2017/0308880 A1* | 10/2017 | Phillips | G06Q 20/18 |
| 2017/0308899 A1* | 10/2017 | Smets | G06Q 20/409 |
| 2018/0005223 A1* | 1/2018 | Terra | G06Q 20/352 |
| 2018/0025348 A1* | 1/2018 | Shauh | G06O 20/3278 |
| | | | 705/44 |

OTHER PUBLICATIONS

How to Link Driving License With Aadhar Card, http://www.aadharcard.biz/how-to-link-aadhaar-with-driving-licence/, Visted Website May 15, 2017, 5 pages.

EP18802343.6, "Office Action", dated Apr. 30, 2020, 8 pages.

\* cited by examiner

PORTABLE DEVICE WITH LOCAL VERIFICATION DATA

BACKGROUND

A number of portable devices are available to be used in completing transactions with resource providers and gaining access to resources. The use of these portable devices often require that the user of the portable device be separately authenticated in order to ensure the security of the transaction. This often requires some action on behalf of the resource provider. However, these actions required on behalf of the resource provider are often inconvenient for users of the portable devices.

Embodiments of the invention address these and other problems, individually and collectively.

BRIEF SUMMARY

Embodiments of the disclosure are directed to systems and methods in which verification data is written to a portable device and used to complete a transaction. In some embodiments, the system identifies a number of trusted third-party entities, and their associated trusted third-party computers, capable of providing verification data associated with a particular user. The system may generate requests to each of the trusted third-party computers for that verification data. The system may then select an appropriate verification data from the responses received from those trusted third-party computers. The verification data is then written to a portable device, which is provided to a user with which it is associated. Once provided, the portable device may be used in a transaction conducted at a resource provider and the verification data may be caused to be displayed on a display operated by the resource provider. In some embodiments, the system may receive a value associated with the verification data (e.g., a hash value). The system may independently generate a value to be compared to the received value in order to determine an authenticity of the verification data.

One embodiment of the invention is directed to a method performed by a service provider computer comprising receiving a request for a portable device to be associated with a user, obtaining verification data associated with the user from a trusted third-party entity computer that maintains verification data, writing the obtained verification data to an electronic memory of the portable device such that when the portable device is used to conduct a transaction via an access device, the verification data is caused to be provided to the access device such that an operator of the access device is able to verify the user using the verification data, and providing the portable device to the user. In some cases, obtaining verification data associated with the user from a trusted third-party entity computer may further comprise determining a number of trusted third-party entity computers capable of providing verification data associated with the user, generating requests to each of the number of trusted third-party entity computers for the verification data associated with the user, and selecting a most current verification data from the received verification data.

Another embodiment of the invention is directed to system comprising: a portable device memory writer, a processor, and a memory including instructions that, when executed with the processor, cause the system to, upon determining that a portable device is to be provided to a user, obtain verification data associated with the user from a trusted third-party computer that maintains verification data, cause the portable device memory writer to write the obtained verification data to a memory substrate of the portable device such that when the portable device is used to conduct a transaction via an access device, the verification data is caused to be provided to the access device such that an operator of the access device is able to verify the user using the verification data, and cause the portable device to be provided to the user.

Yet another embodiment of the disclosure is directed to an access device comprising: a display, a portable device reader, a processor, and a memory including instructions that, when executed with the processor, cause the access device to receive, via the portable device reader, user data from a portable device in relation to a transaction, identify, within the user data, verification data associated with a user of the portable device, and display the verification data on the display. The instructions may further cause the access device to receive, from an operator of the access device, an indication that the user is verified, identify, within the user data, access data associated with the user of the portable device, and initiate a transaction using the access data.

These and other embodiments of the invention are described in further detail below.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to a system and corresponding methods in which verification data is written to a portable device and used to complete a transaction. The verification data may be obtained from one or more trusted third parties and subsequently written to the portable device. The portable device may then be sent to a user. When the user presents the portable device to complete a transaction with a resource provider, the verification data may be obtained from the portable device and displayed on a display operated by the resource provider.

By way of illustrative example, consider a scenario in which a user requests a new credit account with a service provider. In this example, the user may submit the request over the phone or online. Upon being approved for the credit account, the service provider may create a credit card (i.e., a portable device) to be associated with that credit account. The service provider may then determine which trusted third party entities are likely to have verification data for that user. For example, if the user resides in the state of California, then the California state department of licensing may be identified as a trusted third party entity which is likely to have the user's verification data. Based on this determination, the service provider may identify an application programming interface that includes routines for communicating with computers operated by the California state department of licensing. The service provider may use the identified application programming interface to communicate with the computers and request a driver license data (i.e., verification data) associate with the user. Once the service provider has received the driver license data, it may be written to the credit card. The credit card is then mailed to the user at an address that he or she has provided. When the user uses this credit card to complete a purchase at a merchant, the user may swipe his or her card and the driver license information is displayed on the merchant's point-of-sale terminal.

Prior to discussing embodiments of the invention, description of some terms may be helpful in understanding embodiments of the invention.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an transport computer, which can also be generically referred to as a "transport computer".

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "mobile device" may include any suitable client device that can be easily transported by user. Examples of mobile devices are described in detail below.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first network component requesting resources from a second network component. In this example, the transaction is completed when the resources are either provided to the first network component or the transaction is declined.

A "transaction data" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information. Transaction data may include data gathered from authorization requests.

Figure 1:
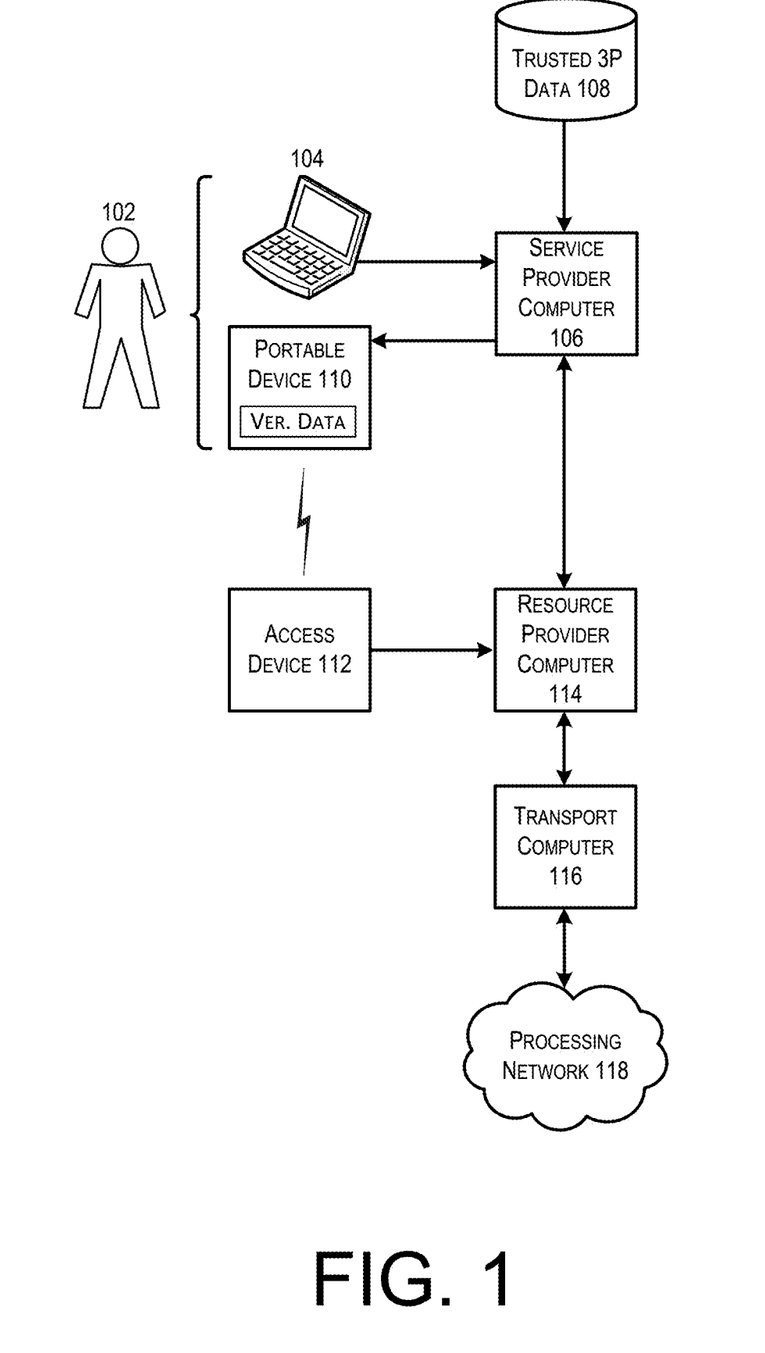
FIG. 1 depicts an illustrative interaction between a user and at least some embodiments of the disclosure.

FIG. 1 depicts an illustrative interaction between a user and at least some embodiments of the disclosure. In FIG. 1, a user 102 may use a client device 104 to communicate with a service provider computer 106. The service provider computer 106 may be in communication with a number of trusted third-party (3P) data sources 108 (e.g., via a network connection). The service provider computer 106 may be configured to write verification data to a portable device 110, which may be sent to the user 102. The user 102 is then able to use the portable device 110 to conduct transactions with a resource provider via an access device 112. In some embodiments, the access device 112 may be located at a physical location operated by the resource provider. The access device 112 may be in communication with a resource provider computer 114, which is owned and/or operated by the resource provider. The resource provider computer 114 may further be in communication with an transport computer, which may be in communication with a processing network 118.

In some embodiments, a service provider may be any suitable entity capable of providing at least a portion of the functionality described within this disclosure. A service provider may maintain and/or operate a service provider computer 106 which executes the functionality described herein in accordance with instructions provided by the service provider. The service provider computer 106 may be configured to identify a user 102 for which a portable device 110 is to be provided. Upon identifying the user 102, the service provider computer 106 may be configured to communicate with a number of trusted third-party data providers 108 to obtain verification data for associated with the user 102. The verification data may include any suitable information related to an identity of the user (e.g., a user's name, date of birth, picture, etc.). Upon obtaining the verification data from one or more of the trusted third-party data providers 108, the service provider may determine which of the verification data is most relevant (e.g., most current). The service provider computer 106 may be configured to write the received verification data to a portable device 110. For example, the service provider may contain portable device memory writer (e.g., a card reader/writer device) for reading data from an integrated circuit (e.g., a universal integrated circuit card) installed within a portable device. Once the verification data has been written to the portable device 110, the portable device 110 may be provided to the user 102. For example, the portable device 110 may be shipped to an address associated with the user 102.

In some embodiments, the trusted third-party data 108 may include any data source identified as a "trusted" data source by the service provider associated with the service provider computer 106. In some embodiments, trusted third-party data sources may include government agencies such as a state department of licensing (DOL), a department of immigration, United States Citizenship and Immigration Services (USCIS), United States Department of Homeland Security (DHS), United States Department of State, etc. In some embodiments, the trusted third-party data 108 may include data sources that are operated by entities unaffiliated with the government. In some embodiments, the service provider computer 106 may access the trusted third-party data 108 via a secure channel.

In some embodiments, the portable device 110 may be any device capable of being used to gain access to a resource. In some embodiments, the portable device 110 may be a plastic payment card (e.g., a credit card) that includes an integrated circuit chip. The integrated circuit chip may include a central processing unit (CPU), read only memory (ROM), random access memory (RAM), electrically erasable programmable read-only memory (EEPROM) and input/output (I/O) circuits. In some embodiments, the integrated circuit may be powered upon coming into contact with an access device. While powered, the integrated circuit may be configured to provide the access device with information relevant to gaining access to a requested resource. In some embodiments, the portable device 110 may be a mobile phone device (or other suitable portable electronic device) capable of transmitting verification information to an access device (e.g., via a contactless reader).

In some embodiments, the resource provider may be a merchant, such as a retailer or other provider of goods and/or services. A resource provider may maintain and/or operate a resource provider computer 114 (e.g., a merchant computer) which provides access to resources in accordance with instructions provided by the resource provider. In some embodiments, the resource provider may maintain a physical location, such as a storefront, at which the access device 112 is located. The resource provider computer 114 may be located local to, or remote from, a physical location.

In some embodiments, processing network 118 may be a network of computing devices configured to receive transaction requests and to route those received transaction requests to appropriate authorization entities. In some embodiments, the processing network 118 may be an electronic payment network (e.g., VisaNet). The processing network 118 may maintain transaction data, which includes historical transaction information associated with a plurality of users. The resource provider computer 114 may interact with the processing network 118 via an transport computer 116.

By way of illustrating the example user interaction depicted, consider a scenario in which a user 102 contacts the service provider computer 106 in order to request a new portable device 110. In this example, the service provider computer 106 may obtain a number of identifying information from the user to determine that user's identity. The service provider computer 106 may identify a user account associated with the user 102. The service provider computer may subsequently contact a number of trusted third-party data sources 108, which the service provider computer 106 may provide with the obtained number of identifying information. The trusted third-party data sources 108 may respond to the service provider computer 106 with verification data associated with the user 102. Upon receiving that verification data, the service provider computer 106 may write the verification data, as well as access data, onto a portable device 110. The portable device may then be caused to be sent to the user 102.

Continuing with this example, the user 102 may use the portable device 110 to conduct a transaction. Upon presenting the portable device 110 to an access device 112, the portable device 110 may convey both the access data and the verification data to the access device 112. In this example, the verification data may be displayed by the access device 112. Upon verifying the verification data, a requested transaction may be completed using the access data.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
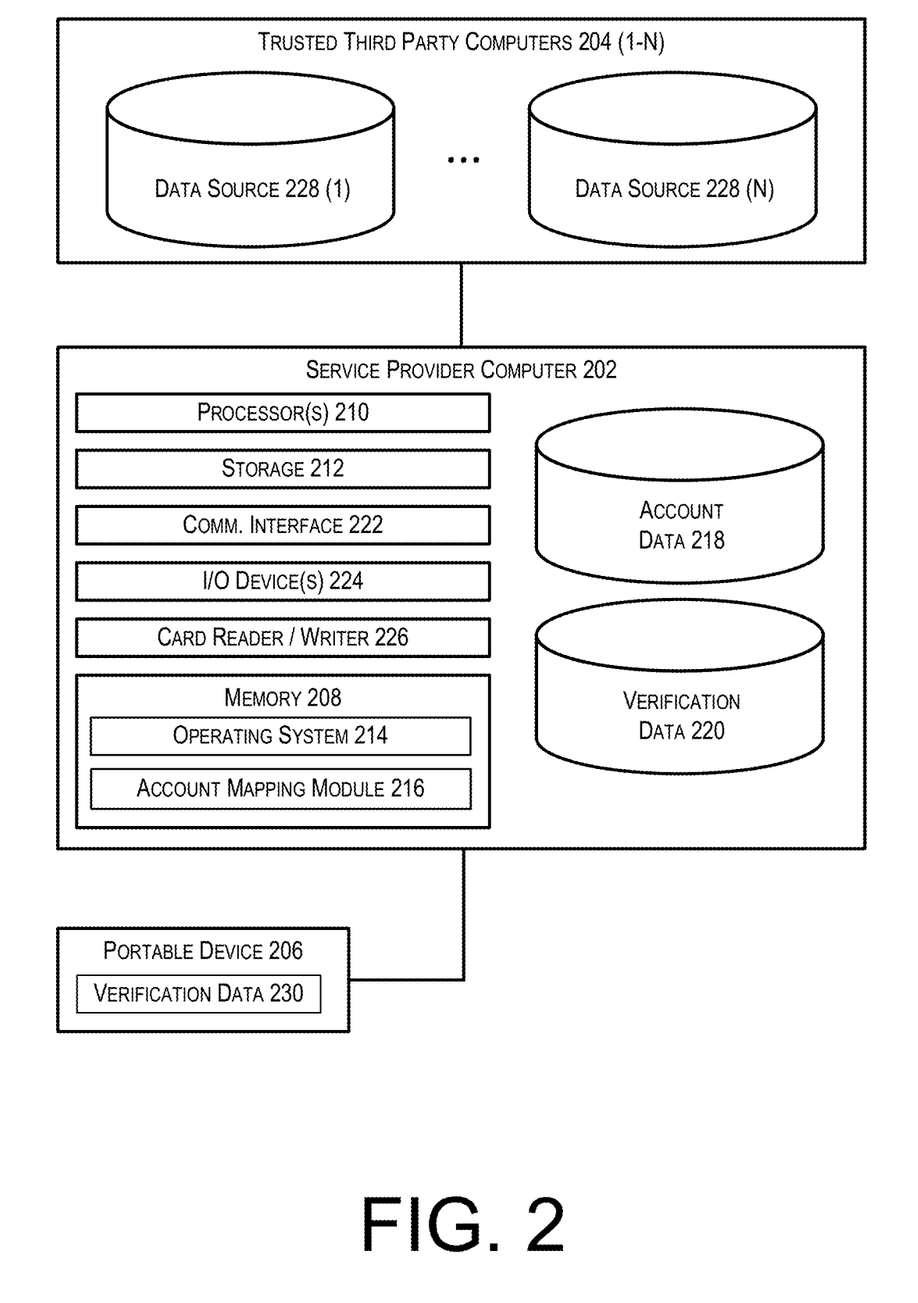
FIG. 2 depicts an example system architecture that may be implemented to write verification data to a portable device in accordance with embodiments of the disclosure.

FIG. 2 depicts an example system architecture that may be implemented to write verification data to a portable device in accordance with embodiments of the disclosure. In FIG. 2, a service provider computer 202 may be in communication with a number of trusted third-party computers 204. The service provider computer 202 may be configured to write information to a portable device 206. In some embodiments, the service provider computer 202 may be an example service provider computer 106 of FIG. 1.

In at least some embodiments, the service provider computer 202 may include at least one memory 208 and one or more processing units (or processor(s)) 210. The processor(s) 210 may be implemented as appropriate in hardware, computer-executable instructions, firmware or combinations thereof. Computer-executable instruction or firmware embodiments of the processor(s) 210 may include computer-executable or machine executable instructions written in any suitable programming language to perform the various functions described.

The memory 208 may store program instructions that are loadable and executable on the processor(s) 210, as well as data generated during the execution of these programs. Depending on the configuration and type of service provider computer 202, the memory 208 may be volatile (such as random access memory (RAM)) and/or non-volatile (such as read-only memory (ROM), flash memory, etc.). The service provider computer 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 202. In some embodiments, the memory 208 may include multiple different types of memory, such as static random access memory (SRAM), dynamic random access memory (DRAM) or ROM.

Turning to the contents of the memory 208 in more detail, the memory 208 may include an operating system 214 and one or more application programs or services for implementing the features disclosed herein including at least a module for communicating with trusted third-party computers 204 and obtaining verification data to be associated with a particular user account (account mapping module 216). The memory 208 may also include account data 218, which provides data stored in association with a user account and/or verification data 220, which provides verification data received from one or more trusted third-party computers 204.

In some embodiments, the account mapping module 216 may, in conjunction with the processor 212, be configured to, upon determining that a portable device 206 is to be provided to a user, determine a number of trusted third party computers 204 from which verification data should be obtained. To do this, the service provider computer 202 may identify a number of conditions associated with trusted third party entities which are met by the user. The account mapping module 216 may then generate a list of relevant third party entities for that particular user. The account mapping module 216 may cause the service provider computer 202 to generate requests for verification data to be transmitted to trusted third party computers 204 associated with each of the trusted third party entities which are on the generated list. The service provider 202 may then receive responses from each of the trusted third party computers 204 that include user verification data associated with the user. Upon receiving this information, the service provider may store the received verification data in verification data 220. In some embodiments, the account mapping module 216 may identify a most relevant set of verification data from the received verification data to be used by the service provider computer 202 (e.g., the most recent of the verification data or the verification data received from the most trusted source).

By way of illustrative example, the account mapping module 216 may cause the service provider computer 202 to determine a number of previous and current addresses for the user. In this example, the service provider may determine that a user currently lives in Washington state, but resided in California state two years ago. Based on this, the service provider computer 202 may append both the Washington state department of licensing and the California state department of licensing to a list of relevant trusted third party entities. In addition to addresses, the service provider computer 202 may determine that the user currently has an open account at XYZ bank, which maintains electronic records for each of its account holders. In this example, the account mapping module 216 may append XYZ bank to the list of relevant trusted third party entities.

Once the list of relevant trusted third party entities has been generated, the account mapping module 216 may cause the service provider computer 202 to generate requests to trusted third party computers 204 associated with each of the trusted third party entities on the list. The account mapping module 216 may sort the verification data received from each of the trusted third party computers 204 by date in order to ensure that the most recent verification data is selected. Once sorted, the service provider computer 202 may select the most recent verification data to be written to the portable device 206.

The service provider computer 202 may also contain communications interface(s) 222 that enable the service provider computer 202 to communicate with a stored database, another computing device or server, one or more remote devices, other application servers, and/or any other suitable electronic devices. In some embodiments, the communication interface 222 may enable the service provider computer 202 to communicate with other electronic devices on a network (e.g., on a private network). The service provider computer 202 may also include input/output (I/O) device(s) and/or ports 224, such as for enabling connection with a keyboard, a mouse, a pen, a voice input device, a touch input device, a display, speakers, a printer, etc. Additionally, the service provider computer 202 may include a card reader/writer 226 capable of reading data from, and writing data to, a memory of a portable device 206. For example, the card reader/writer 226 may be configured to write data to a credit card that contains an integrated circuit card.

In some embodiments, the trusted third-party computers 204 (1-N) may include a number of server devices, each of which may be affiliated with different third party entities (entities unaffiliated with the service provider computer 202). In some embodiments, each of the trusted third-party computers 204 may maintain a respective data source 228 that includes verification data obtained with respect to a number of users. In some embodiments, each of the trusted third-party computers 204 may be associated with a government agency. In some embodiments, the service provider computer 202 may maintain a list of available trusted third-party computers 204 and conditions under which those trusted third-party computers 202 should be contacted. Some non-limiting examples of trusted third party entities that may include a state's department of licensing, the department of State (which maintains passport information), the department of Citizenship and Immigration Services (which maintains immigration information), or any other suitable entity. In some embodiments, a trusted third-party entity may include a corporation or other entity which is unaffiliated with the government. For example, a banking institution that maintains user information for its users may be a trusted third-party entity.

In some embodiments, the portable device 206 may be any portable electronic device capable of communicating with an access device. The portable device 206 may include a secure memory that includes various data fields. The secure memory may include a chip, magnetic stripe, or any other suitable memory substrate. In some embodiments, the portable device 206 may include an integrated circuit card that, when powered by an access device, is configured to provide various information stored in the memory to the access device in order to complete a transaction. The service provider computer 202 may write verification data 230 to the memory of the portable device 206. The portable device 206 may, upon the verification data 230 being written to its memory, be physically transported to a user with which it is associated.

Figure 3:
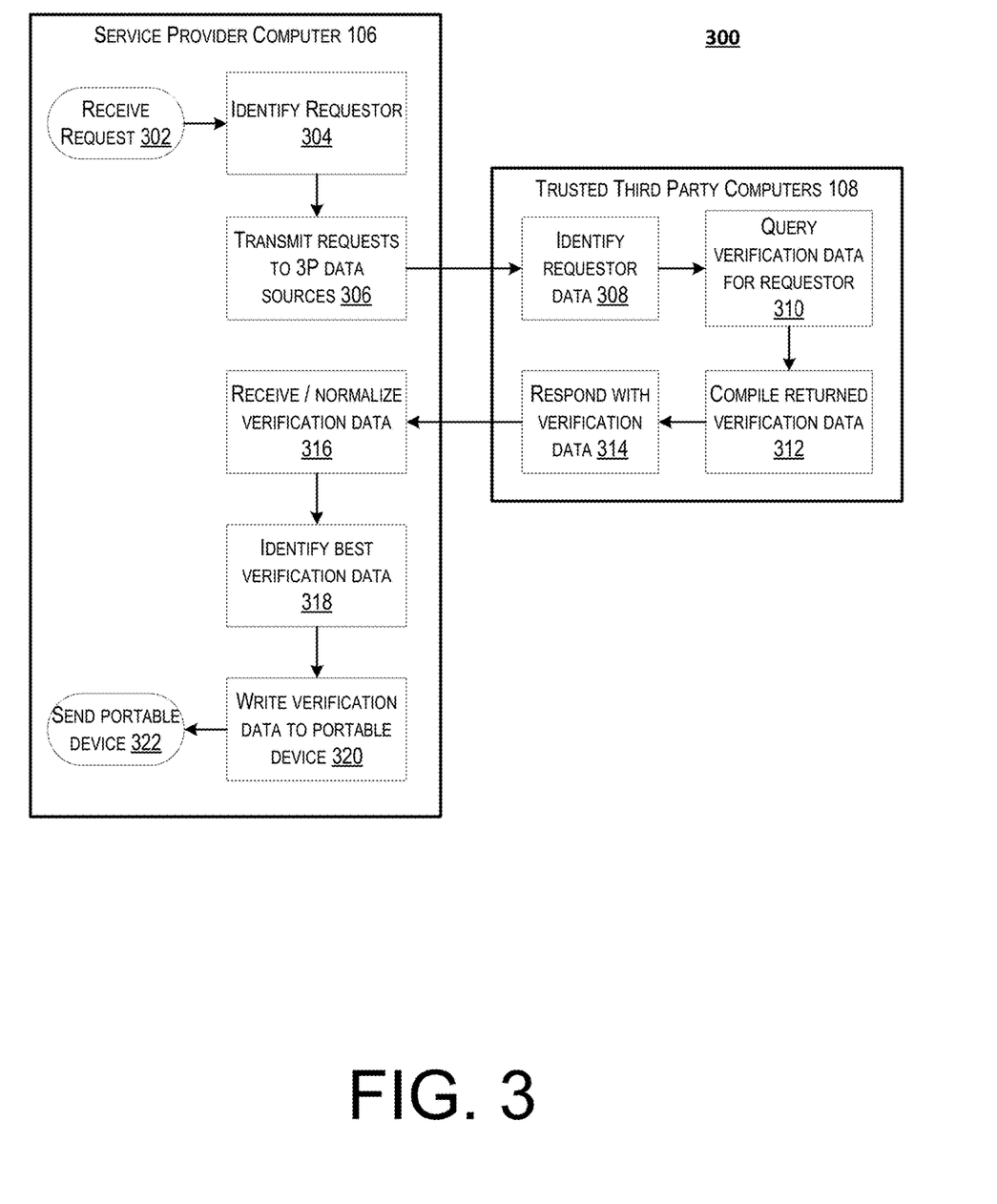
FIG. 3 depicts a flow diagram illustrating a process for providing a portable device to a user that includes verification data in accordance with at least some embodiments.

FIG. 3 depicts a flow diagram illustrating a process for providing a portable device to a user that includes verification data in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 depicted in FIG. 3 may be performed by the service provider computer 202 as described with respect to FIG. 2 above. The code may be stored on a computer-readable storage medium, for example, in the form of a computer program including a plurality of instructions executable by one or more processors. The computer-readable storage medium may be non-transitory.

In some embodiments, the process 300 may begin at 302, when a request is received by a service provider computer 106 to provide a portable device having stored verification data. In some embodiments, the request may be a request for a new credit card or other payment device. For example, a user may enroll in an account to be maintained by the service provider and may request a portable device that enables the user to access functionality associated with his or her account.

At 304, the service provider computer 106 may identify the user associated with the received request. In some embodiments, the user may be required to provide identifying information (e.g., a social security number, driver's license number, or any other suitable identifier). In some embodiments, the user may already be associated with an account maintained by the service provider computer 106. For example, a user that already has an account may request a replacement portable device. In this example, the user may be identified based on his or her login information. In some embodiments, the service provider computer 106 may authenticate or verify a user by asking him or her to provide verification information (e.g., personal details, etc.). A resource provider may then verify the verification data by comparing the verification data to a user. If the resource provider determines that the verification information does not match the user, then it may decline the transaction.

Once the service provider computer 106 has identified the user, the service provider may identify a number of trusted third-party data sources capable of providing verification data for the user. The trusted third-party data sources may be identified based on one or more conditions met by the user. For example, the service provider computer may identify departments of licensing for states that the user currently resides in as well as for states that the user has previously resided in. The service provider computer 106 may generate a list of such trusted third-party data sources to be contacted for verification data. Upon identifying a list of trusted third-party data sources, the service provider computer may identify application programming interfaces (APIs) used to communicate with each of the identified trusted third-party data sources. For example, the service provider computer 106 may maintain a library of APIs, each of which is associated with a trusted third-party data source and includes routines and/or methods used to enable communication between the service provider computer 106 and a corresponding trusted third-party data source. The service provider computer 106 may generate requests for each of the identified trusted third-party data sources, which each may be transmitted to the respective trusted third-party data source at 306.

Upon receiving a request generated by the service provider computer 106, a trusted third party computer 108 may identify the user associated with the request at 308. In some embodiments, the trusted third party computer 108 may be provided with identifying information provided to the service provider computer 106. The identifying information may include multiple details relating to the user. For example, the trusted third party computer 108 may be provided with a name and date of birth. In some embodiments, the trusted third party computer 108 may request clarifying information (e.g., if multiple users are found that match the identifying information).

At 310, the trusted third party computer 108 may query one or more data sources for verification data related to the identified user. In some embodiments, the trusted third party computer 108 may maintain a number of different databases that include user information, each of which may be queried. Upon receiving responses to a number of queries, the trusted third party computer 108 may compile those query responses into a complete set of verification data for the user at 312. The complete set of verification data may be transmitted to the service provider computer 106 at 314. In some embodiments, the trusted third party computer 108 may format the information according to a template provided by the service provider computer 106 before transmitting the information. In some embodiments, the service provider computer 106 may formulate the query to be run by the trusted third party computer 108 based on database information maintained in relation to the trusted third party computer 108. In these embodiments, the query response may be returned as-is.

At 316, the service provider computer 106 may receive the verification data from a number of trusted third party computers 108. In some embodiments, the service provider computer 106 may normalize the data received from each of the trusted third party computers 108 in order to put the data into a common format. In some embodiments, the format may be a common table into which the data is written with each field of the table representing an attribute of the user. In this example, values provided in the verification data by each trusted third party computer 108 may be written to their corresponding data field of the table. In some cases, verification data provided by one trusted third party computer 108 may include less than, or more than, verification data provided by another trusted third party computer 108.

At 318, the service provider computer 106 may identify a most appropriate verification data to be included on the portable device. In some embodiments, the most appropriate verification data may be the most recent verification data (e.g., the verification data associated with the latest date). In some embodiments, each trusted third party computer 108 may be assigned a level of trust and the most appropriate verification data may be the verification data associated with the most trusted third party computer 108. In some embodiments, the most appropriate verification data may be determined based on some combination of factors associated with the verification data itself and/or the trusted third party computers from which that data was received.

At 320, the service provider may write the verification data to the portable device. In some embodiments, the verification data may be written to a magnetic strip on the portable device, such that the verification data may be obtained by swiping the portable device in a card reader. In some embodiments, the verification data may be written to a solid-state memory that uses electrically programmable non-volatile flash memory. For example, the verification data may be written to a memory included in a universal integrated circuit chip (UICC) that, when powered by an access device, performs processing and provides the verification data to the access device. In some embodiments, the verification data may be encrypted in order to prevent unauthorized access. In these embodiments, the verification data may be decrypted by the UICC or by the access device.

At 322, the portable device may be provided to the user associated with the request. In some embodiments, the service provider computer 106 may be remote to the user and the portable device may be physically shipped to that user. For example, upon writing the verification data to the portable device, the service provider computer 106 may initiate a fulfillment process in which the portable device is collected, packaged, and carried by carrier to a location (e.g., an address) associated with the user.

It should be noted that although the example described process relates to a user placing an order with a remote service provider computer 106, in some embodiments, the user may be within proximity of the service provider computer 106. For example, in at least some embodiments, the user may approach a kiosk that includes the service provider computer 106. In this example, the user may place his or her own portable device into a card reader communicatively coupled to the service provider computer 106 and verification data may be written to the user's portable device in the manner described. In another example, the service provider computer 106 in the kiosk may be communicatively coupled to a printing device capable of imprinting the user's information onto a new portable device and writing the verification data to a memory of that portable device.

Figure 4:
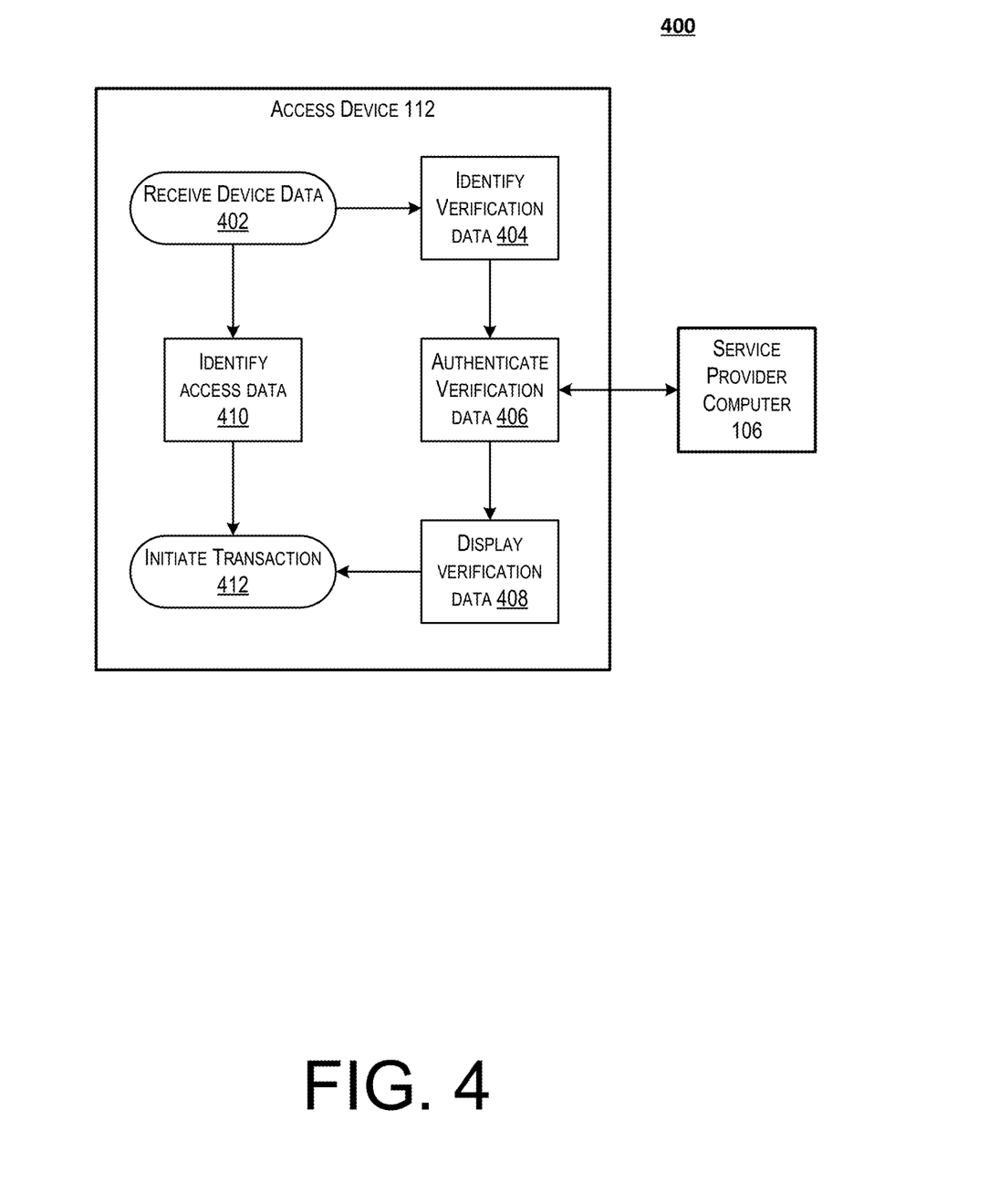
FIG. 4 depicts a flow diagram illustrating a process for providing a portable device to a user that includes verification data in accordance with at least some embodiments.

FIG. 4 depicts a flow diagram illustrating a process for providing a portable device to a user that includes verification data in accordance with at least some embodiments. In accordance with at least one embodiment, the process 400 depicted in FIG. 4 may be performed by the access device 112 as described with respect to FIG. 1 above.

In some embodiments, a user may wish to conduct a transaction with a resource provider (e.g., a merchant) using the portable device provided as a result of process 300 described above. In these embodiments, the user may select a number of resources for which the transaction is to be conducted and may present the portable device. Process 400 may begin at 402, when device data is received from a portable device by the access device 112 associated with the resource provider. In some embodiments, the device data may be received via a contactless reader in communication with the access device 112. In some embodiments, the device data may be received via a card chip/magnetic stripe reader in communication with the access device 112.

At 404, the access device 112 may identify the verification data stored on the portable device. In some embodiments, the verification data may be encrypted or otherwise secured. In these embodiments, the access device 112 may store one or more encryption keys to be used in decrypting verification data that it receives. In some embodiments, the access device 112 may be required to provide a password or other code to the portable device to receive the verification data.

In some embodiments, the access device 112 may verify the authenticity of the verification data at 406 before initiating the transaction. In some embodiments, this may involve contacting the service provider computer 106 and comparing one or more attributes associated with the verification data to attributes on record. For example, the access device 112 may be configured to create a hash value from one or more attributes of the verification data (e.g., size, create date, values located within the verification data, etc.), which may be transmitted to a service provider computer 106 to determine if it matches a hash value generated independently by that service provider computer 106. Verifying the authenticity of the verification data by ensuring that it matches data stored on the service provider computer 106 may ensure that the verification data has not been tampered with or otherwise altered. In some embodiments, the access device 112 may decline the transaction if the authenticity of the verification data cannot be verified.

At 408, the access device 112 may cause the verification data, or a portion thereof, to be displayed to the resource provider. At this step, the verification data may be presented on a display device communicatively coupled to the access device. For example, the verification data may include a picture of the user that may be presented on a monitor operated by a merchant. The merchant may be prompted, by a notification also displayed on the monitor, to check that the picture matches the user of the portable device before proceeding with the transaction.

At 410, once the verification data has been confirmed and the transaction is clear to proceed, the access device 112 may identify access data within the device data received at 402. The access data may be any data capable of providing access to an account or other source of funds. For example, the access data may be a credit card number or bank account number. The access device 112 may initiate the transaction using the identified access data at 412. For example, the access device 112 may generate an authorization request message that includes the access data and may subsequently route that authorization request message to an appropriate authorization entity (e.g., via a transport computer and processing network).

Although the disclosure describes verification data being stored locally on the portable device, it should be noted that embodiments of the disclosure may involve verification data stored remotely (e.g., on the service provider computer). In these embodiments, the portable device may include an identifier that enables the service provider to quickly identify any verification data associated with the portable device. The merchant, upon receiving this identifier, may communicate the identifier to the service provider computer. The service provider may then transmit the identified verification data to the merchant, where it may be used in the fashion described. It should be noted that embodiments in which verification data is stored locally on a portable device may be advantageous in that the verification data may be accessed quicker and in areas where network availability is limited or unavailable.

Figure 5:
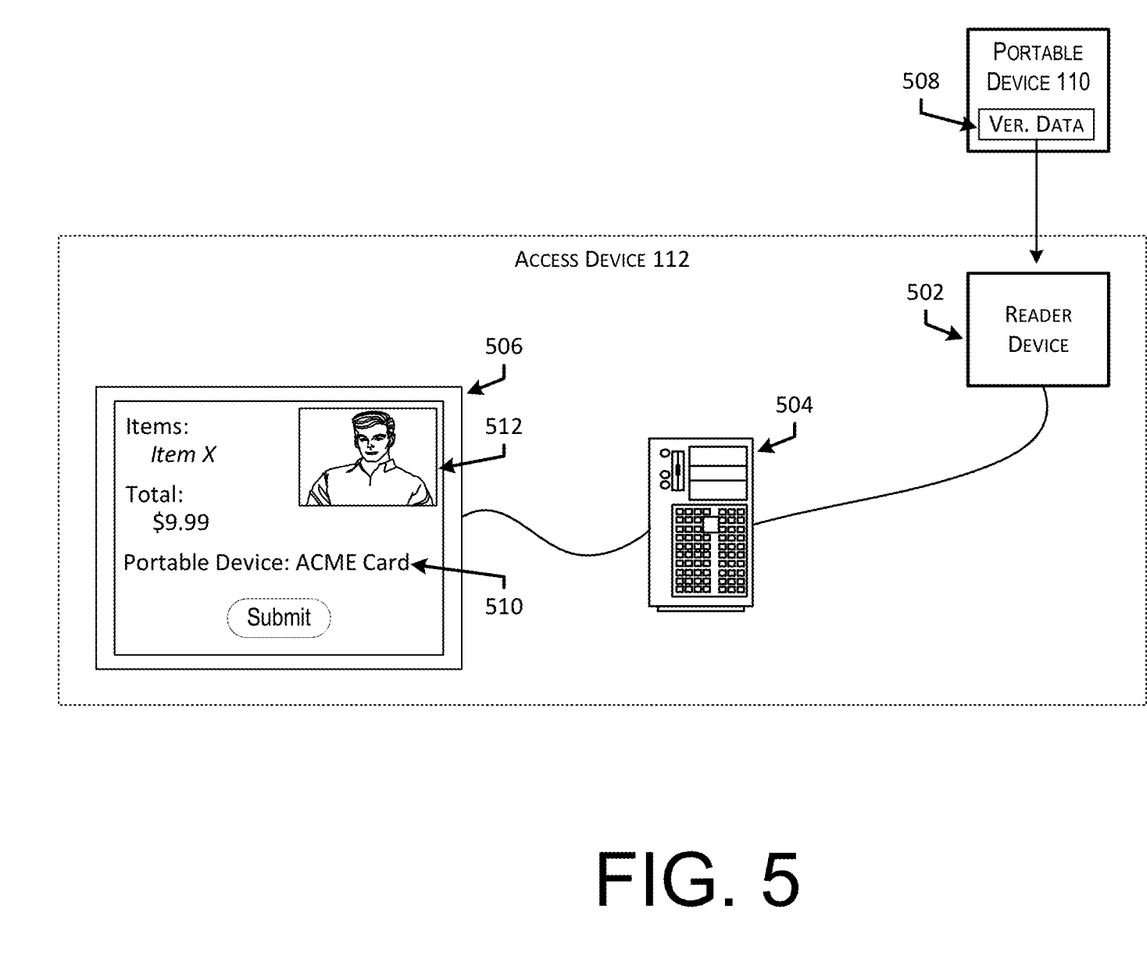
FIG. 5 depicts an illustrative example of an embodiment of the disclosure in which a portable device is used in conjunction with a POS terminal in accordance with at least some embodiments.

FIG. 5 depicts an illustrative example of an embodiment of the disclosure in which a portable device is used in conjunction with an access device in accordance with at least some embodiments. In FIG. 5, the access device 112 (which is an example of the access device 112 depicted in FIG. 1) is a merchant point of sale (POS) terminal that includes at least a reader device 502, a merchant computer 504, and a display device 506.

In this example, the reader device 502 is configured to interact with the portable device 110 to receive verification data 508 from the portable device 110 along with access data. In some embodiments, the reader device 502 may be a contactless reader device capable of receiving data from the portable device 110 wirelessly. In some embodiments, the reader device 502 may be configured to receive verification data from the portable device upon direct contact with the portable device. For example, the reader device 502 may be a magnetic stripe reader configured to read a magnetic stripe located on the portable device or a chip reader configured to read a chip on the portable device when it is inserted into a slot.

The merchant computer 504 may be a point-of-sale (POS) terminal configured to receive information related to a number of resources in a transaction and to initiate a transaction for those resources. In some embodiments, the merchant computer may be operated by an operator. For example, the operator may scan item barcodes to provide an indication of each item to the merchant computer 504. The merchant computer 504 may compile a list of items for which the transaction is to be conducted. Upon compiling a complete list, a user that requested the items may present the portable device 110 to the reader device 502. Upon presentation of the portable device, the reader device may read user data from the portable device and relay that user data to the merchant computer 504. The merchant computer 504 may identify, within the user data, access data 510 and verification data 512 associated with the user of the portable device. In some embodiments, the merchant computer 504 may need to decrypt the identified verification data 512. Once the verification data 512 has been identified, the merchant computer may cause that verification data 512 to be displayed on the display 506. The merchant computer 504 may cause a number of additional details related to the transaction to be displayed on the display along with the verification data. Once the operator of the access device provides an indication that the user is verified (e.g., by responding to a prompt or selecting a button on the display), the merchant computer 504 may initiate a transaction using the access data 510. For example, the merchant computer 504 may generate an authorization request message to be used to complete the transaction.

Figure 6:
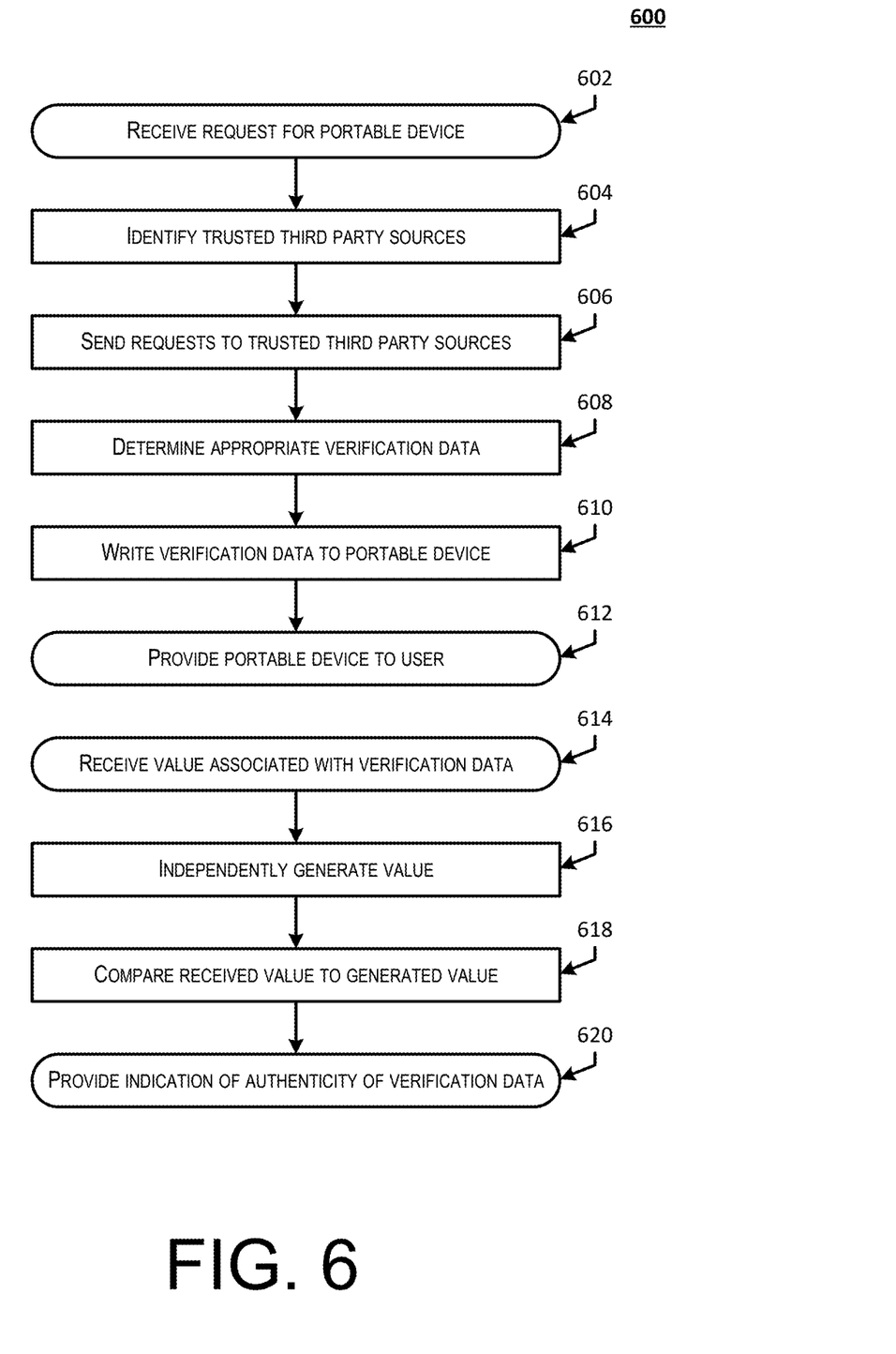
FIG. 6 depicts a flow diagram illustrating a process for providing an aggregated list of responses and context-based content in accordance with at least some embodiments.

FIG. 6 depicts a flow diagram illustrating a process for providing an aggregated list of responses and context-based content in accordance with at least some embodiments. The process 600 may be performed by a service provider computer 202 as depicted in FIG. 2.

Process 600 may begin at 602, when a request is received for a portable device. In some embodiments, the request may be received when a user enrolls in an account to be maintained by the service provider computer. For example, the user may order a credit card by enrolling in a credit program maintained by the service provider. In some embodiments, the request may be submitted automatically (e.g., without user interaction). For example, the service provider computer may determine that a portable device currently associated with the user should be replaced. In this example, the service provider computer may determine that an expiration date associated with the current portable device has been exceeded or is close to being exceeded.

At 604, the service provider computer may identify a number of trusted third party entity computers from which verification data may be available for the user. In some embodiments, the third party entity computers may be identified based on one or more conditions met by the user for which the verification data is to be obtained. For example, the trusted third party entity computers may be identified based on a naturalization status of the user. In another example, the trusted third party entity computers may be identified based on a current or previous address of residence associated with the user.

At 606, the service provider computer may transmit requests to each of the third party entity computers to obtain verification data from one or more of those third party entity computers. In some embodiments, the service provider computer may maintain a library of APIs associated with each of the trusted third party computers that each include routines for communicating with that trusted third party computer. For example, the service provider may maintain a list of method calls associated with each trusted third-party computer. The service provider may use APIs associated with each of the trusted third-party computers to generate requests for, and transmit those requests to, each of those third-party computers.

At 608, the service provider computer may determine an appropriate set of verification data to be used. The service provider may receive a number of responses from various third party computers to which requests were sent. In some embodiments, trusted third-party entities may be ranked according to a level of trust associated with that third party entity. For example, each trusted third party entity may be assigned a value that represents an amount of trust that the service provider places in the third-party entity. In some embodiments, this level of trust may be determined as a function of a level of security maintained by the third party entity (e.g., an ease with which the third party computers may be infiltrated by unauthorized parties), economic incentives/disincentives for maintaining accurate verification data, or any other suitable factor that affects the trustworthiness of an entity.

In some embodiments, the appropriate verification data may be a combination of verification data obtained from multiple trusted third party computers. For example, if the most trusted third-party entity includes data values for fields 1-5, but does not have a data value for field 6, then the service provider may look to another third-party entity to provide that data value.

At 610, the service provider computer may write the verification data to a portable device. In some embodiments, the service provider computer may encrypt the verification data according to a predetermined encryption protocol. The service provider may write the verification data to any suitable memory included on the portable device. For example, the service provider computer may use a portable device memory writer device to write the verification data to a magnetic stripe or a solid-state memory chip (e.g., a flash memory).

At 612, the portable device may be provided to the requesting user. In some embodiments, the portable device may be caused to be shipped to the user at an address associated with that user. In some embodiments, the address may be one stored in association with the user's account. In some embodiments, the portable device may be removed from a card reader manually (e.g., by an operator) and placed in an outgoing mail receptacle.

In some embodiments, the service provider computer may also perform a process to verify the authenticity of the verification data. In this process, the service provider computer may receive a value associate with the verification data at 614. For example, an access device that obtains the verification data may generate a hash value based on attributes of the verification data. The hash value may be generated using a predetermined hash function. In some cases, the verification data itself may be received.

At 616, the service provider computer may independently generate a value based on the verification data. For example, upon receiving the value from the access device, the service provider may use the same function (e.g., hash function) as the access device to independently generate the value. At 618, the service provider computer may compare the independently generated value to the received value to determine the authenticity of the verification data. For example, if the verification data written to the portable device matches the verification data stored by the service provider computer, then the received value should match the independently generated value. If, on the other hand, the verification data written to the portable device does not match the verification data stored by the service provider computer, then the received value should not match the independently generated value.

At 620, the service provider computer may provide an indication as to whether the verification data is likely to be authentic. For example, if the received value matches the independently generated value, then the verification data is likely to be authentic, whereas if the received value does not match the independently generated value, then the verification data is likely not to be authentic.

Figure 7A:
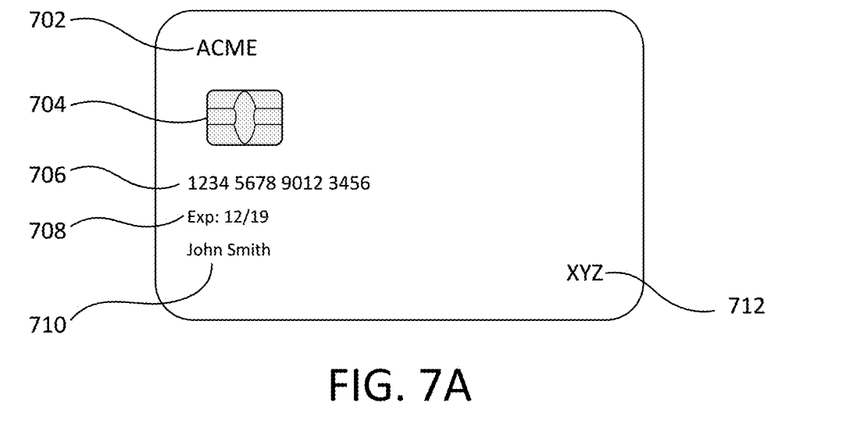
FIG. 7A depicts a first side of an example portable device that may be used in accordance with embodiments of the disclosure.

FIG. 7A depicts a first side of an example portable device that may be used in accordance with embodiments of the disclosure. In FIG. 7A, the portable device is a credit card.

In some embodiments, the portable device may include an issuer indicator 702 that provides an indication of the authorization entity backing the portable device. In some embodiments, the issuer indicator 702 may include a name or logo of the authorization entity.

The portable device may include an integrated circuit chip 704 (sometimes referred to as a "smart chip"). A portable device having an integrated circuit chip 704 may be a Europy, Mastercard, and Visa (EMV) card. EMV cards are smart cards (also called chip cards or IC cards) that store their data on an integrated circuit chip 704 in addition to magnetic stripes (for backward compatibility). These include cards that must be physically inserted (or "dipped") into a reader and contactless cards that can be read over a short distance using radio-frequency identification (RFID) technology. Payment cards that comply with the EMV standard are often called "Chip and PIN" or "Chip and Signature" cards, depending on the authentication methods employed by the card issuer. The integrated circuit chip 704 may include a processor and memory that includes preloaded instructions. When powered (e.g., by being inserted into a chip reader), the processor of the integrated circuit chip 704 may be caused to perform the preloaded instructions. In some embodiments, the memory may also include verification data which, when the integrated circuit chip 704 is powered, may be provided to a chip reader.

The portable device may include access data 706 (e.g., an account number). The access data 706 may comprise a 15 to 19 digit number. In some embodiments, the access data 706 may be allocated in accordance with International Standards Organization (ISO) standard 7812. In this standard, the leading six digits of the access data 706 number may be the "issuer identification number (IIN)", sometimes referred to as the "bank identification number (BIN)." The remaining numbers of the access data 706, except the last digit, may be the individual account identification number. The last digit is often a check digit (e.g., a Luhn check digit). The IIN or BIN may be used by a processing network to identify an appropriate authorization entity to which transactions using the portable device should be routed.

The portable device may include an expiration date 708 that indicates a period of validity of the portable device. The expiration date 708 indicates a date after which the portable device is no longer valid. In some cases, the user may be required to provide the expiration date to complete a transaction. In the event that the user provides an incorrect expiration date, the transaction may be declined. For example, credit card transactions conducted online or over the phone will often require that the user provide the correct expiration date 708 in order to verify that the user is actually in possession of the credit card. These transactions may be declined if the user is not able to provide the correct expiration date.

The portable device may include an account holder name 710 that indicates a user or other entity with which the portable device is associated. An authorization entity may maintain an account for the account holder indicated in the account holder name 710. In some embodiments, a transaction may be declined if a name given in association with the account does not match the indicated account holder name 710.

The portable device may include a processing network indicator 712 that indicates a transaction processing network used to route authorization requests associated with the portable device. In some embodiments, merchants may accept portable devices associated with certain processing networks. For example, some merchants may only accept portable devices associated with Visa.

Figure 7B:
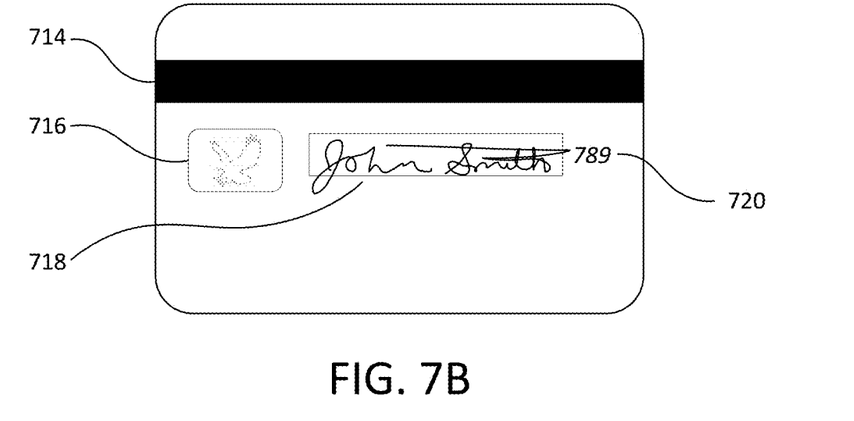
FIG. 7B depicts a second side of an example portable device that may be used in accordance with embodiments of the disclosure.

FIG. 7B depicts a second side of an example portable device that may be used in accordance with embodiments of the disclosure. Similar to FIG. 7A, the portable device depicted in FIG. 7B is also a credit card.

The portable device may include a magnetic strip 714. The magnetic strip 714 may include up to three tracks, known as track 1, track 2, and track 3. In some embodiments, only track 1 and track 2 are used. The minimum cardholder account information needed to complete a transaction is present on both tracks. Track 1 has a bit density of 210 bits per inch and is the only track that may contain alphabetic text, and hence is the only track that contains the cardholder's name. Track 2 has a bit density of 75 bits per inch.

The portable device may include a hologram 716 or other suitable authentication mechanism. A hologram is a mirror-like section that shows a three dimensional image. Holograms are security features which help merchants identify whether a portable device is valid or not. Holograms often require expensive equipment to produce and are able to be used to validate the authenticity of the portable device based on the unlikelihood that an unauthorized party would be able to replicate the hologram 716.

The portable device may include a signature block 718. In some embodiments, the portable device must be signed before it may be used in a transaction. During a transaction, the merchant is often supposed to check the signature of the signature block 718 against the signature provided by a user who signs a receipt for the transaction.

The portable device may include a security code 720. A security code 720 might be a CVV, CVV2, CVC, CSC, CID, or any other suitable security code. In the scenario in which the processing network associated with the portable device is Visa, MasterCard, or Discover, the security code 720 is a three digit code on the back of the portable device. In the scenario in which the processing network associated with the portable device is American Express, the security code 720 is a four digit code located on the front of the card. The security code is used to verify that a user is in possession of a valid portable device.

Embodiments of the invention provide for a number of technical advantages over conventional systems. For example, embodiments of the invention enable merchants and other resource providers to quickly verify the identity of a user of the portable device without physically handling the user's ID or portable device. For example, a user is able to self-scan his or her portable device via a reader and the user's verification data will be displayed on a display device linked to that reader. Additionally, the merchant can be assured that the verification data is legitimate as it originates from a trusted source. Thus, transactions are made more secure by implementations of the disclosed system.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, at an access device via a portable device reader in communication with the access device, user data from a portable device in relation to a transaction, wherein the portable device comprises a payment card having the user data stored in an integrated circuit;
    identifying, by the access device within the user data, verification data associated with a user of the portable device, wherein the verification data comprises at least an image of the user;
    displaying, by the access device, the verification data on a display device in communication with the access device wherein the image of the user is caused to be displayed by the access device in a manner which enables an operator to manually verify the verification data;
    receiving, by the access device from the operator, an indication that the user is verified;
    identifying, by the access device within the user data, access data associated with the user of the portable device; and
    initiating the transaction using the identified access data.

2. The method of claim 1, wherein the access device comprises a point-of-sale (POS) terminal.

3. The method of claim 1, wherein the indication that the user is verified is received in response to prompting the operator to compare the verification data to the user.

4. The method of claim 1, wherein initiating the transaction using the identified access data comprises generating an authorization request message that includes the access data.

5. The method of claim 1, wherein the portable device reader is a credit card reader.

6. The method of claim 1, further comprising:
    generating a value based on the identified verification data;
    transmitting the value to a service provider computer;
    receiving a response from the service provider computer indicating a validity of the verification data; and
    displaying the verification data on the display device only if the verification data is valid.

7. An access device comprising:
    a display;
    a portable device reader;
    a processor; and
    a memory including instructions that, when executed with the processor, cause the access device to, at least:
        receive, via the portable device reader, user data from a portable device in relation to a transaction, wherein the portable device comprises a payment card having the user data stored in an integrated circuit;
        identify, within the user data, verification data associated with a user of the portable device, wherein the verification data comprises at least an image of the user;
        display the verification data on the display, wherein the image of the user is caused to be displayed by the access device in a manner which enables an operator to manually verify the verification data;
        receive, from the operator of the access device, an indication that the user is verified;
        identify, within the user data, access data associated with the user of the portable device; and
        initiate a transaction using the access data.

8. The access device of claim 7, wherein a number of details of the transaction are displayed on the display along with the verification data.

9. The access device of claim 7, wherein the portable device reader is a chip reader.

10. The access device of claim 7, wherein the instructions further cause the access device to decrypt the verification data prior to displaying the verification data on the display.

11. The method of claim 6, wherein the generated value is a hash value generated from the user data, and wherein the validity of the verification data is determined via independent generation of the hash value.

12. The method of claim 1, wherein the user data is embedded into the integrated circuit by an issuer associated with the credit card.

13. The method of claim 12, wherein at least a portion of the user data is provided to the issuer associated with the credit card by a trusted third party determined to be affiliated with the user.

\* \* \* \* \*